UNITED STATES PATENT OFFICE.

J. H. HALL, OF NEW YORK, N. Y.

IMPROVED MODE OF PRESERVING EGGS.

Specification forming part of Letters Patent No. 87,562, dated March 9, 1869; antedated March 3, 1869.

*To all whom it may concern:*

Be it known that I, J. H. HALL, of the city, county, and State of New York, have invented an Improved Process and Composition for Preserving Eggs; and I do hereby declare that the following is a full and exact description thereof.

First. A liquor is prepared by heating water to boiling, and throwing red-hot charcoal therein, in the proportion of about half a pint of the charcoal to a gallon of water. In this fluid the eggs are kept immersed a month, or thereabout, and if the eggs are required to be used within that time, no further process nor additional material is required; but if the eggs are required to be kept longer than about one month, another liquid is prepared by dissolving half a pint of lime and half a pint of common salt in three gallons of water, or in about that proportion. Into this solution the eggs are transferred, and are kept immersed therein until required for use. They will keep perfectly fresh for months thus treated.

The use of the charcoal-water in the beginning of the process is essential.

Although the salt and lime solution has great preservative qualities, it does not, of itself alone, keep the eggs perfectly fresh, since it penetrates the shell, and the salt and lime are, to some extent, absorbed by the albumen of the eggs, and impart their taste thereto, so that, in truth, the eggs are pickled thereby; but by first applying the charcoal-water the preservative principle of the charcoal, as it is absorbed by the eggs, preserves the same without imparting any flavor to them, it being tasteless. Thus the lime and salt are excluded from the albumen of the eggs, and those materials act only as an outside preservative or protection. Hence the eggs are not salted or pickled by their presence.

On the other hand, although the charcoal-water, taken in through the pores of the egg-shells, prevents for a time the oxidation of the eggs, by the union of carbon and oxygen in the production of carbonic-acid gas, and though this may be theoretically or experimentally true of the inside of the egg, where the presence of a slight amount of air is not so active as is the external air, yet, practically, the charcoal cannot be relied on after a certain length of time, and then the assistance of the lime and salt becomes necessary for sure preservation.

This second solution keeps the outside shell of the egg white and delicately fresh. Thus the charcoal is the inside preservative, and the lime and salt the outside preservative.

The shells of preserved eggs are peculiarly liable to crack in boiling. To prevent this, let the eggs be dipped in vinegar for a short time before boiling. This softens the shell, and makes them sufficienly yielding to preserve them from cracking by the pressure of the heated air within.

What I claim as my invention, and desire to secure by Letters Patent, is—

1. The use of the charcoal-water in the process of preserving eggs, substantially as herein specified.

2. Also, the process herein described, as a whole, substantially as set forth.

3. Also, the immersion of the eggs in vinegar, or moistening them therewith, previous to boiling, for the purpose set forth.

The above specification signed by me this 18th day of August, 1868.

J. H. HALL.

Witnesses:
W. W. HALL,
J. S. BROWN.